(12) United States Patent
Martinez et al.

(10) Patent No.: US 7,028,103 B2
(45) Date of Patent: *Apr. 11, 2006

(54) MULTI-MEDIA SYNCHRONIZATION SYSTEM

(75) Inventors: Anthony Edward Martinez, Spicewood, TX (US); Valerie Jill Fox, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 774 days.

This patent is subject to a terminal disclaimer.

(21) Appl. No.: 10/007,046

(22) Filed: Nov. 8, 2001

(65) Prior Publication Data

US 2003/0088621 A1    May 8, 2003

(51) Int. Cl.
*G06F 15/16* (2006.01)

(52) U.S. Cl. .................................... 709/248

(58) Field of Classification Search ............ 725/38–61; 709/248; 345/418, 156, 501
See application file for complete search history.

(56) References Cited

U.S. PATENT DOCUMENTS

| | | | | |
|---|---|---|---|---|
| 5,900,916 A | * | 5/1999 | Pauley | 725/59 |
| 5,903,563 A | * | 5/1999 | Rashid et al. | 370/395.65 |
| 6,084,638 A | | 7/2000 | Hare et al. | 348/552 |
| 6,108,687 A | * | 8/2000 | Craig | 709/203 |
| 6,243,772 B1 | | 6/2001 | Ghori et al. | 710/68 |
| 6,259,443 B1 | | 7/2001 | Williams | 345/329 |
| 6,272,680 B1 | | 8/2001 | Gaughan et al. | 725/112 |
| 6,281,880 B1 | | 8/2001 | Rose et al. | 345/158 |
| 6,331,851 B1 | * | 12/2001 | Suzuki et al. | 345/419 |
| 6,459,456 B1 | * | 10/2002 | Oh | 348/564 |
| 6,560,655 B1 | * | 5/2003 | Grambihler et al. | 709/248 |
| 6,584,099 B1 | * | 6/2003 | Sato et al. | 370/362 |
| 6,654,785 B1 | * | 11/2003 | Craig | 709/203 |
| 6,654,815 B1 | * | 11/2003 | Goss et al. | 709/248 |
| 6,654,826 B1 | * | 11/2003 | Cho et al. | 710/62 |
| 6,772,435 B1 | * | 8/2004 | Thexton et al. | 725/91 |
| 2002/0065939 A1 | * | 5/2002 | Liu | 709/248 |
| 2003/0061370 A1 | * | 3/2003 | Nakayama et al. | 709/231 |

* cited by examiner

*Primary Examiner*—Krisna Lim
(74) *Attorney, Agent, or Firm*—David A. Mims, Jr.; Robert V. Wilder (57) ABSTRACT

An improved methodology and implementing system are provided in which a docking station is arranged to receive and dock a number of individual wireless personal information management (IM) units. In an exemplary embodiment, the personal IM units include touch-sensitive flat display screens. One or more of the personal wireless IM units may be individually removed from the docking station and operated to selectively and individually communicate with the docking station to access and retrieve more detailed information related to a presentation being made in another medium such as a TV or even an associated live presentation. In one example, the docking station is arranged to receive input from a TV system relative to which channel is being presented on the TV and is enabled to access and retrieve detailed information from a server which is related to the content of the current TV presentation. Alternatively, a user may select to use the personal IM unit independently of the TV to access selected unrelated web sites or to retrieve information from a server concerning a past or scheduled future TV presentation. The docking station includes means for determining which of a number of personal IM units is front-most in the docking station. The server is generally programmed ahead of time with detailed information related to scheduled TV programs and may also be coupled to a TV station directly to dynamically provide additional content for unscheduled TV programs.

10 Claims, 7 Drawing Sheets

MULTI-MEDIA SYNCHRONIZATION SYSTEM

FIELD OF THE INVENTION

The present invention relates generally to information processing systems and more particularly to a methodology and implementation for accessing information related to a selected media presentation.

RELATED APPLICATIONS

Subject matter disclosed and not claimed herein is disclosed and claimed in related co-pending applications Ser. No. 10/007,064 filed on Nov. 8, 2001, and Ser. No. 10/007,065 filed on Nov. 08, 2001, which are assigned to the assignee of the present application.

BACKGROUND OF THE INVENTION

While modern television (TV) provides an immersive, shared experience, it is passive and has no means of interactivity or access to "in-depth" or detailed information concerning the TV presentations being made. More and more people are using the Internet to satisfy their need for information on spectator sports, entertainment and big name events. The World Wide Web ("the web") can be used to enhance the TV viewing experience by giving viewers interactive views, more comprehensive information and access to a global community of people with similar interests in a connected environment.

Although television and web mediums can be complementary, today's approach of providing an integrated experience has significant drawbacks. One drawback is related to the available "visual real estate". Integrating TV and web into a single screen reduces the amount of real estate or screen space available for each medium. The strategies of splitting the screen or overlaying one medium atop another medium to provide more content usually detract from the overall experience by adding clutter and distracting visual "noise".

Another drawback of the current approach is in social scope and interaction styles. The interaction styles of TV and web presentations are completely different. TV is for the most part a public and passive viewing experience while the web is a highly personal and interactive experience. When TV and web media are combined on the same screen, the social scope/interaction style of the one medium interferes with that of the other medium.

Thus, there is a need for an improved method and system for selectively providing information which supplements and is coordinated with a selected presentation in a given medium.

SUMMARY OF THE INVENTION

An improved methodology and implementing system are provided in which a docking station or docking device is arranged to receive a number of individual wireless information management (IM) units or electronic "pads". In an exemplary embodiment, the personal IM units include touch-sensitive display screens and are rechargeable at the docking station. One or more of the personal wireless IM units may be individually removed from the docking station and operated to selectively and individually communicate with the docking station to access and retrieve more detailed information related to a presentation being made in a given medium such as a TV. The docking station is arranged to receive input from a TV system relative to which channel is being presented on the TV and upon receiving a user request, is enabled to access and retrieve detailed information from a server which is related to the content of the current TV presentation. Alternatively, a user may select to use the personal IM unit independently of the TV to access selected unrelated web sites or to retrieve information from a server concerning a past or scheduled future TV presentation. The docking station includes means for determining which of a number of personal IM units is front-most in the docking station array such that the front-most personal IM unit docked in the docking station will continue to display available detailed content related to the TV channel being played despite the removal of any of the personal IM units by another user, including the front-most IM unit. The docking station may also be embodied in a cable or satellite receiver thereby serving a dual purpose. The server is programmed ahead of time with detailed information related to scheduled TV programs and may also be coupled to a TV station directly to dynamically provide additional content for unscheduled or live TV programs via a separate interconnection network such as the Internet. In another embodiment, one or more docking stations may be arranged to broadcast to and service a large number of individual IM pads which may be distributed or rented at a live event to provide additional information and/or Internet services to individual users while attending the event.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented with a typical server computer system which may include a server workstation. Both the server and the docking station and personal IM units include code to implement the methodology hereinafter disclosed. In general, an implementing computer server system may include a plurality of processors in a multi-bus system in a network of similar systems. However, since the server implemented in the exemplary embodiment of the present invention is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Figure 1:
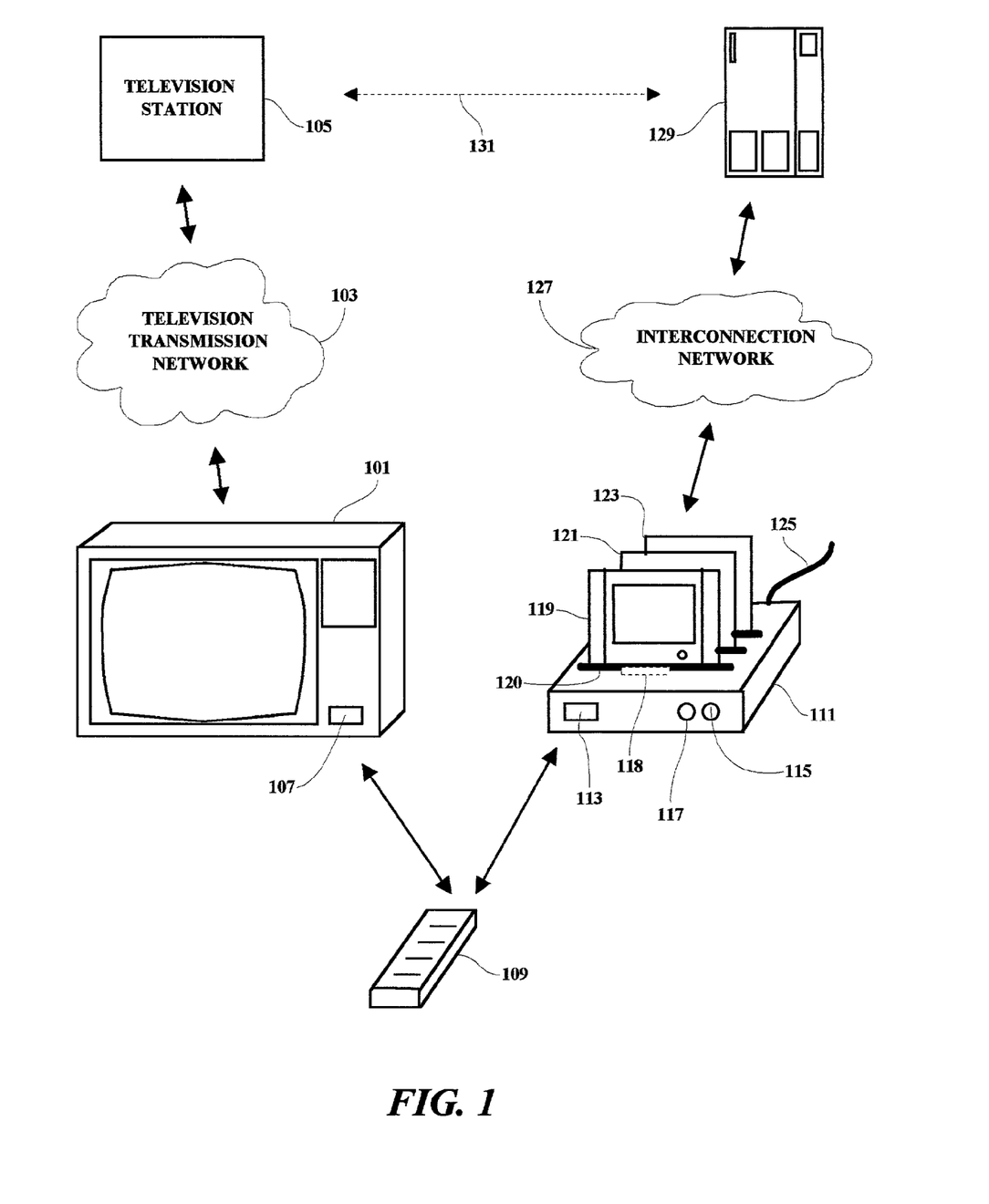
FIG. 1 is schematic system diagram showing an overall system arrangement connected in accordance with the present invention.

In an exemplary embodiment as shown in FIG. 1, a TV 101 is arranged for connection through an interconnection network 103 to a TV station 105. It is noted here that although a TV presentation is used for demonstration purposes, the present invention may also be implemented in connection with a radio broadcast or other media presentation to provide a means to select and retrieve associated and more detailed information than that presented during the primary media presentation. Since the IM units are wireless, they could also be brought to or rented at a live baseball game for example, or any other live performance venue so long as there is a docking station within range and arranged to communicate with the IM units. Enhanced camera shots may also be provided through the IM unit medium. As shown in the example, the TV 101 includes an infrared (IR) sensor 107 for receiving IR signals from a remote controller 109. Such IR signals include information regarding the particular channel which the user of the remote unit wishes to view.

Also shown in FIG. 1 is a docking station or docking device 111 which also includes an IR sensor 113 which is able to detect the same information being sent to the TV from the remote controller 109 including the identity of the selected TV station or channel. As noted earlier, the docking station can also be coupled to the TV receiver to obtain channel information. The docking station includes a power button 115 for turning the docking station on and off, and also a display button 117 for turning the display screen of the front-most IM unit on and off. The docking station 111 is shown with three personal IM units or electronic pads 119, 121 and 123 connected into corresponding receptacles, such as receptacle 120, of the docking station. In this disclosure, the terms "IM unit", "pad" or "electronic pad" are used interchangeably. The receptacles are designed to mechanically support the personal IM units 119-123 as well as to provide electrical connections through a matching plug/receptacle 118. The wireless personal IM units 119-123 are charged through the docking station when the IM units are mounted into the docking station 111. The docking station is connected to a power source through cable 125. When detached from the docking station 111, the personal IM units are able to communicate with the docking station 111 through any wireless technology. In the example, radio frequency (RF) technology is preferred since it does not require a direct line-of-sight so that the personal IM units may be carried and operated from a larger area with substantial immunity from objects that would interfere with a line-of-sight system. The docking station 111 is arranged for connection through an interconnection network 127, such as the Internet, to a server 129. The docking station 111 may be connected to the Internet via any number of ways, including, but not limited to, telephone, cable, modem, DSL, satellite, etc. The server 129 is programmed with additional detailed content ahead of the time a TV program is to be broadcast so that it is available to a viewer as the viewer watches a selected scheduled TV program. The server 129 may, however, also have a direct coupling 131 to a TV station 105 for receiving additional streaming content for unscheduled or live TV programs which is then made available to docking stations to provide supplemental additional information concerning the unscheduled or live TV programs.

Figure 2:
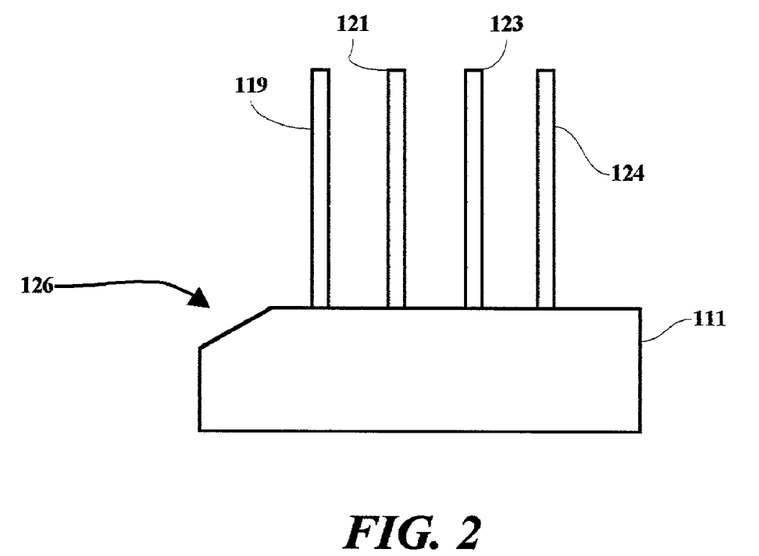
FIG. 2 is an illustration of a side view of the docking station and four personal IM units coupled to the docking station.

In FIG. 2, there is shown a side view of a docking station 111 with four personal IM units 119, 121, 123 and 124 mounted thereon. In the FIG. 2 example, the front face of the docking station 111 could have a sloping surface 126 to facilitate viewing of displays of various system parameters such as an LED display of the channel to which the associated television is currently tuned, which of the personal IM units are currently in use, power-on indication etc. As illustrated, the personal IM units are relatively thin, lightweight units and docking stations may be designed to accommodate different numbers of the personal IM units. For example, an individual may wish to have a docking station with only one personal IM unit while a family of four may wish to have a docking station designed to dock any number of the personal IM units for which there are corresponding slots on the docking station.

Figure 3:
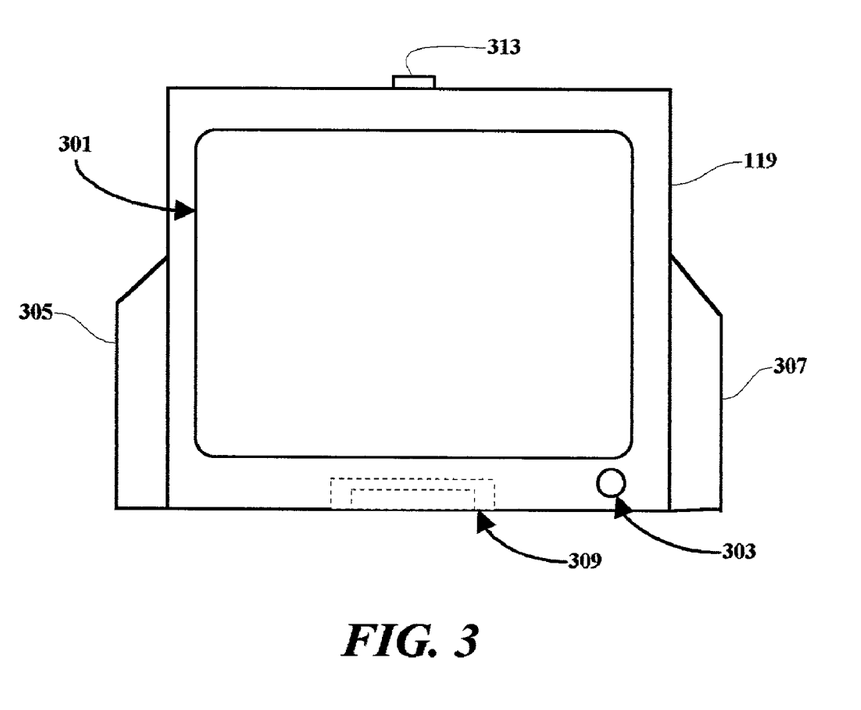
FIG. 3 is a more detailed view of an exemplary personal unit showing gripping edges and transceivers mounted thereon.

In FIG. 3, there is illustrated another view of an individual IM unit 119, including gripping edges 305 and 307 to facilitate grasping and handling of the IM unit 119. Other gripping units may also be used. Also shown is a transceiver 313, which is used to accomplish the wireless communication function between the IM unit 119 and the docking station 111. The exemplary embodiment of the IM unit 119 includes a touch sensitive color Liquid crystal display (LCD) 301. As is hereinafter described, the touch sensitive screen 301 is used to display information as well as menu options and even a "soft" keyboard display for user input. The exemplary IM unit 119 also includes a power on-off switch 303 by which selected individual ones of the IM units may be turned on and off. Shown in phantom outline is an exemplary electrical connection means 309 by which the personal IM units, e.g. 119, are electrically connected to the docking station 111 when the IM units are mounted into the respective slots, e.g. 120, of the docking station 111.

Figure 4:
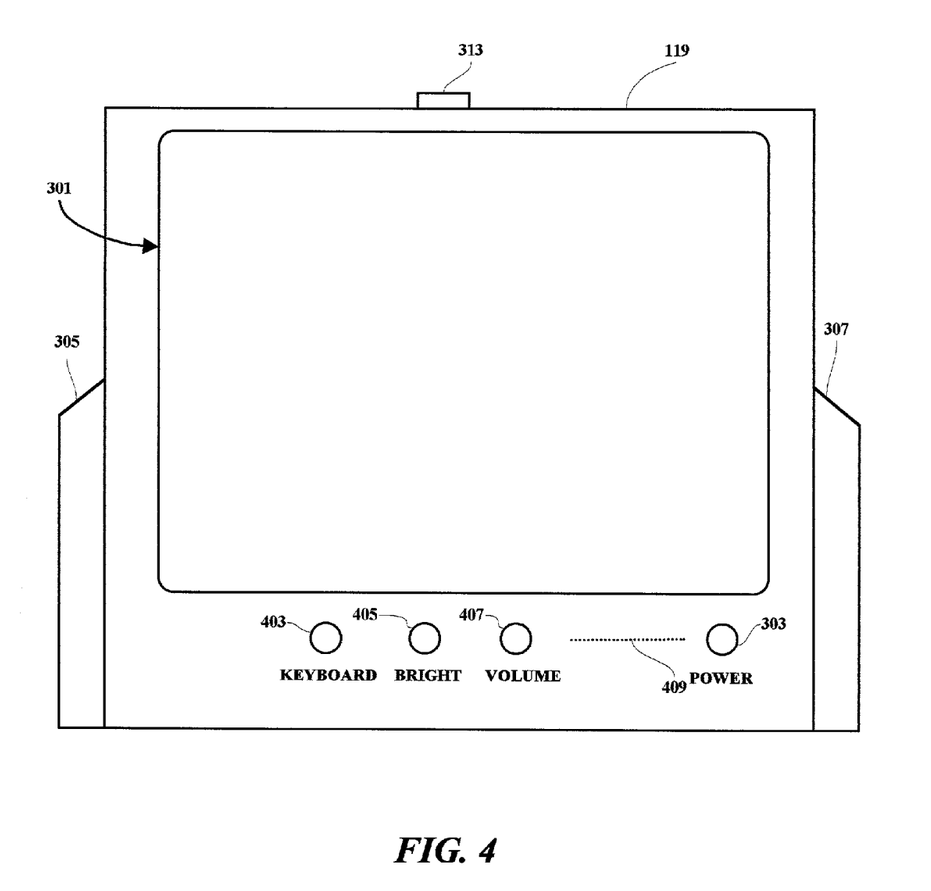
FIG. 4 is a more detailed view of an exemplary personal IM unit showing a number of selection controls.

In FIG. 4, a more detailed view of an IM unit 119 is illustrated showing an exemplary arrangement for several of the IM unit control features. As shown, the IM unit 119 includes several control buttons 403-407 which may be used to control several features of the IM units. When in a synchronized or autopilot mode, the IM unit 119 will synchronize a related information display from server 129 on the IM screen 301 with the time and/or channel of the associated TV 101 being viewed. As hereinbefore noted, this synchronization may also be accomplished relative to a radio broadcast or closed circuit TV presentation or other selected media means. A Keyboard button 403 is arranged to be selected by a user to effect the presentation of a keyboard image or "soft" keyboard on at least a portion of the display screen 301. The touch sensitive nature of the display screen 301 thereby allows the user to use the displayed keyboard to enter information and/or menu selections to the IM unit. A Bright button 405 allows an adjustment of the brightness of the display and a Volume button 407 enable adjustment of the volume of the sound from the IM unit. Additional controls 409 may be added to the front panel of the IM unit 119 to enable control of additional functional features.

In operation, the docking station 111 of the exemplary embodiment is placed beside or near a TV unit 101. The present invention is designed to interface with the TV system by acquiring the channel designation from the TV remote control unit 109 or from the TV or cable box. A particular advantage of the exemplary IM system is that it does not interfere with an existing TV system and can be operated in conjunction with any existing TV system. The docking station knows which channel the associated TV is tuned to from input from the TV remote unit 109 or, optionally, there is be a separate input on the docking station or IM unit for a user to input the channel for which the IM unit viewer wishes to view the related available server information content. The data connection between the docking station 111 and the server 129 enables streaming content to the docking station 111 that is synchronized with the TV channel being viewed. The docking station 111 transmits the content to the IM units 119–123 through a wireless connection to a transceivers 313. The docking station 111 is also enabled to receive input from the IM units 119–123 and transmit that input to the server 129. Using this mechanism, a TV program is enhanced with additional contextual and other content that is synchronized to the program and sent to individual personal IM units from the docking station without disrupting the public TV viewing experience and with no visual clutter added to the TV viewing screen.

The personal IM units 119, 121, 123 are thin portable monitor/tablet units that automatically synchronize to the current TV channel being viewed. By communicating with the docking station, the IM units can display information, links and interactivity related to the specific TV program being viewed (when operating in "autopilot" mode) or just connect to the Internet and not relate to the TV programming (when operating in a "manual" mode), by appropriately setting switch 517. In the preferred embodiment, the IM units wirelessly communicate with the docking station 111 by means of either IR or RF signals. RF is the preferred method since it is not reliant upon a clear line of sight, but IR can be used for compatibility with TV sets, for changing channels, volume control, etc.

Each of the IM units has a built-in stand (not shown for the sake of clarity) which can be opened, for example like a picture frame, to provide stand-alone support for each of the IM units. The docking station has multiple functions. It acts as a charging station for the IM units. The docking station also is constantly retrieving streaming information from a specialized website server which is accessible over the Internet. The stream is "tuned" to a server channel which is tied to the channel currently being viewed on the TV. The docking station 111 sends the streaming information it receives from the server to the currently active IM units for processing and display via the wireless transceivers. The docking station receives input from the individual IM units and sends that input to the server, resolving links into pages, retrieving page information and sending the retrieved information back to the appropriate requesting IM unit. The docking station is arranged to serve many IM units individually and substantially at the same time. Different ones of the IM units or different links may also be content rated for different audiences. The IM units can also be turned on but remain in the docking station so as to be viewed next to the TV unit. The IM units need not always be locked into the TV channel being viewed and any individual IM unit can be taken off "autopilot" and placed in the "manual" mode by actuating a link or an "autopilot" button 617 thereby allowing an operator to get to other web content, related or unrelated to the TV channel, and proceed at the operator's own pace.

The docking station system also includes a "front-most" detection feature by which it may be determined which of the docked IM units is "front-most" in the docking station and therefore viewable by an individual who is also viewing the nearby television. This is important in order to enable the front-most IM unit (i.e. the IM unit mounted closest to the front of the docking station) to display information whenever IM units are added or removed from any of the mounting slots 120 of the docking station. For example, suppose a family has purchased a docking station with four individual IM units. The docking station is placed next to a TV and all IM units are docked into the docking station and charging their respective onboard batteries. The docking station and the front-most IM unit are positioned such that when one is watching the TV, the front-most IM unit can be viewed without removing it from the docking station. One member of the family turns on a selected channel and decides not to pick up a TM unit, but instead, presses the "Display" button 117 on the docking station 111. While remaining docked, the front-most TM unit turns on and begins to display enhanced content relative to the tuned TV channel. Next assume a second member of the family arrives and grabs another TM unit. Although the second member can choose and take any of the four docked TM units, the second member chooses to take the front-most TM unit. As the front-most TM unit is taken from the docking station, the next TM unit in the array is now the front-most TM unit and is automatically turned on and continues to display the server information so that the first member can continue to view the front-most TM unit without interruption. In the array of docked TM units, all of the TM units are automatically set with the same settings as the front-most TM unit so that, until changed by an individual user, all of the TM units will have the same settings such as the Synch setting and the "Autopilot" setting. After removing the TM unit from the docking station, the second member is able to actuate the Synch switch to go into a "manual" mode and "surf the web", independently of the TV program, using the touch sensitive screen for input. After the second member has finished the web session, the TM unit that was used is returned to the docking station. If that TM unit is placed in the front-most slot of the docking station, then a determination of the front-most TM unit is again automatically made and the newly placed TM unit again displays the information content associated with the tuned TV channel.

Figure 5:
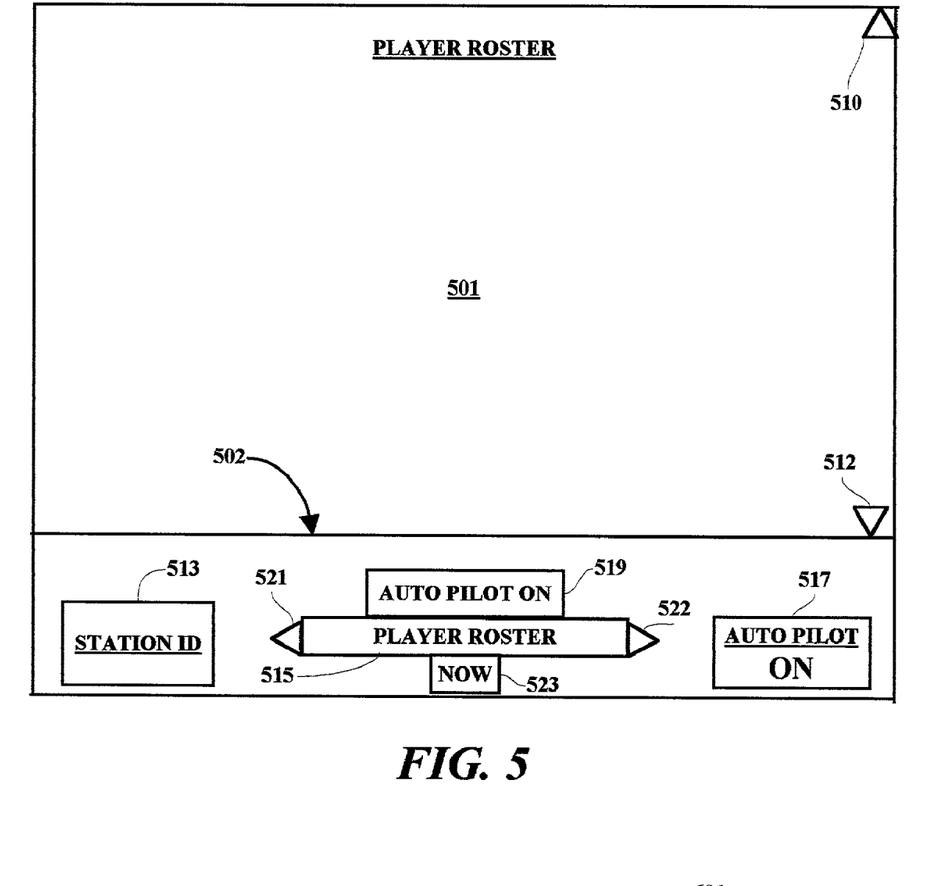
FIG. 5 is an exemplary screen which may be displayed on an IM unit.

The exemplary screen illustrated in FIG. 5 shows an overall screen display area 501 which includes content provided by a selected website server 129. As hereinbefore noted, the screen in the exemplary embodiment is touch sensitive such that selected links displayed on the touch-sensitive display may be touched with a finger-tip for example, to indicate an operator selection of the "touched" menu item.

Figure 6:
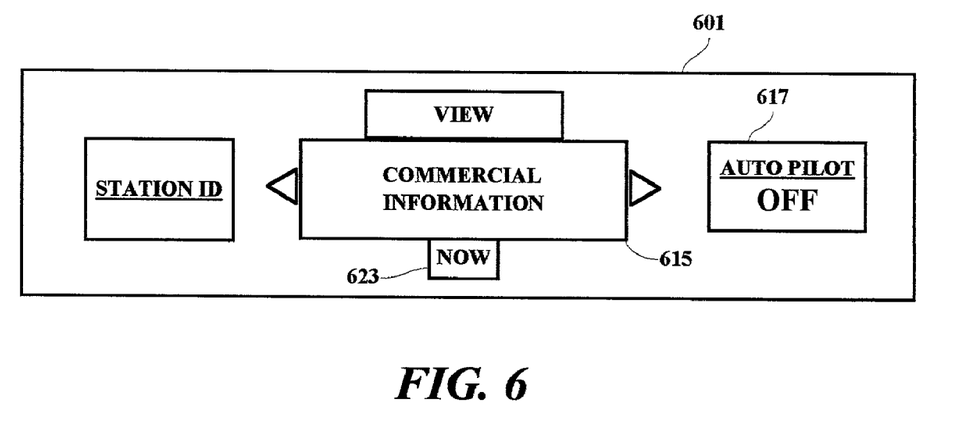
FIG. 6 is another example of the synchronization bar portion of an exemplary IM unit screen.

The exemplary screen 501 shows a "Player Roster" which may be displayed to provide further detail for a baseball game being watched on an associated TV. An "up" arrow 510 and a "down" arrow 512 may be used to scroll when the main window content extends beyond the defined window area 501. In a lower section of the display below line 502, there is a control area which is used to indicate several selections and controls for other aspects of the displayed web page and related television program. The TV station identification is displayed 513 in one block and an indication of the ON/OFF status of the synchronization function, i.e. "Autopilot", is shown in another block 519. An ON/OFF toggle switch 517 for the Autopilot function is also shown. Also shown is a page title block 515 ("PLAYER ROSTER") which displays the title of the page being presented in the main display area 501. Side arrows 521 and 522 are also included to allow a user to move to a previous or subsequent page presentation. A "NOW" block 523 is also shown to allow a user to reset the synch display back to a data stream now playing in connection with the television channel being viewed. When the Autopilot is ON as indicated in FIG. 5, the server presentation tracks the television program being watched with related information and links as indicated. When on "Autopilot", the server presentation is synchronized to the TV program so long as the operator does not touch a menu item or link on the display screen 501. However, when an operator of an IM unit or pad either selects the Autopilot toggle switch 517 or selects another channel 513 or link, then the pad automatically switches out of the Autopilot mode to an unsynchronized or manual mode in which the operator is able to navigate through various windows and sites on the screen display and is no longer synchronized with the TV presentation. While the operator is "surfing the web" using the IM unit 119, the related TV presentation continues independently as scheduled on the television 101. For example, as shown in the synch bar 601 of FIG. 6, when a commercial is showing on the TV 101 as indicated in the window 615, the operator may toggle the Autopilot button 617 and the Autopilot will switch to and indicate an "OFF" status. At that time, the operator can use the IM unit 119 to select a related link to find out additional information while the commercial is playing on the TV. After viewing the related link, the operator may then touch the "NOW" button 623 to "re-synch" the pad display 501 to the TV program in order to continue to watch the server-available information concerning the TV program being watched.

As noted earlier, although the above describes an exemplary use of the docking system in connection with the viewing of a television program, the disclosed system may also be used in many other applications as well. For example, a central docking station may be installed at a baseball game and each customer who comes to watch a game may rent out an IM unit to use while watching the baseball game. The server-available information may be broadcast from one or more docking stations to a great number of IM units throughout the ballpark and each customer would be able to activate various links on the IM unit and access and retrieve much information while watching the game, even, perhaps checking the operator's email or processing work-related information.

Figure 7:
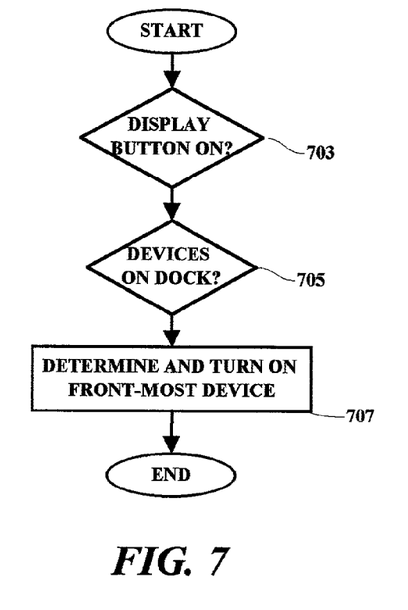
FIG. 7 is a flow chart illustrating an exemplary sequence of operation in connection with the docking unit.
Figure 8:
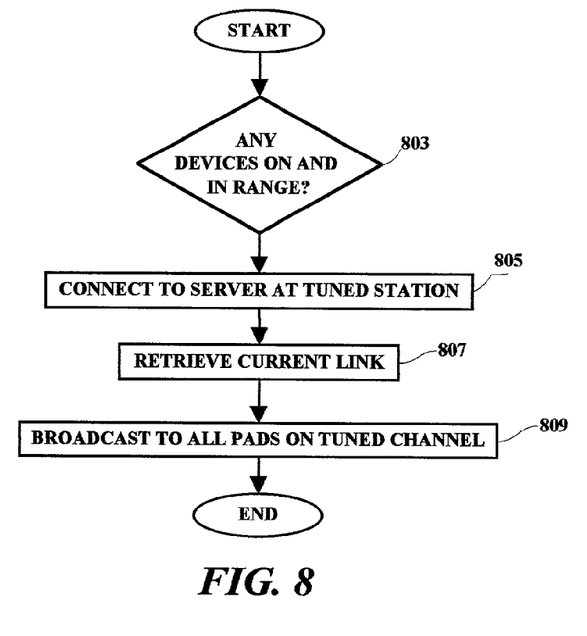
FIG. 8 is a flow chart illustrating another exemplary sequence of operation in retrieving and broadcasting a current link by the docking unit.
Figure 9:
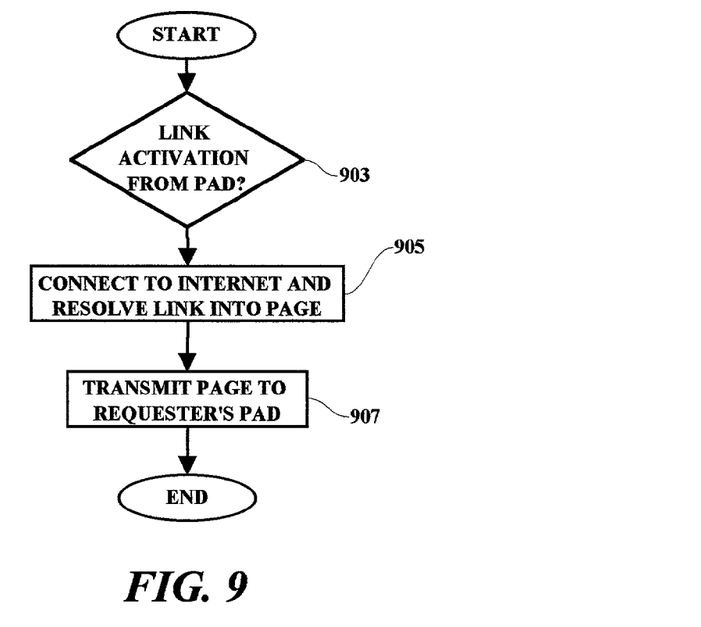
FIG. 9 is a flow chart illustrating a retrieval function by the docking unit.

As shown in FIG. 7, when the docking station 111 determines that the display button 117 is on 703 and that there is at least one IM unit or pad "on-dock" 705 or coupled to the docking station, then a determination is made as to which of the units is front-most in the docking station and the front-most unit is turned ON 707. When it is detected that one or more IM units 119 are "in-range" 803 of the docking station 111, then the docking station connects to the server at the tuned station 805 and retrieves the current link 807 and broadcasts the retrieved link content to all IM pads or units which are tuned to the indicated channel 809. When a link is activated from an IM pad 903, the docking station connects to the Internet, resolves the link into a page 905 and then transmits the page at the designated link to the requesting pad 907.

Figure 10:
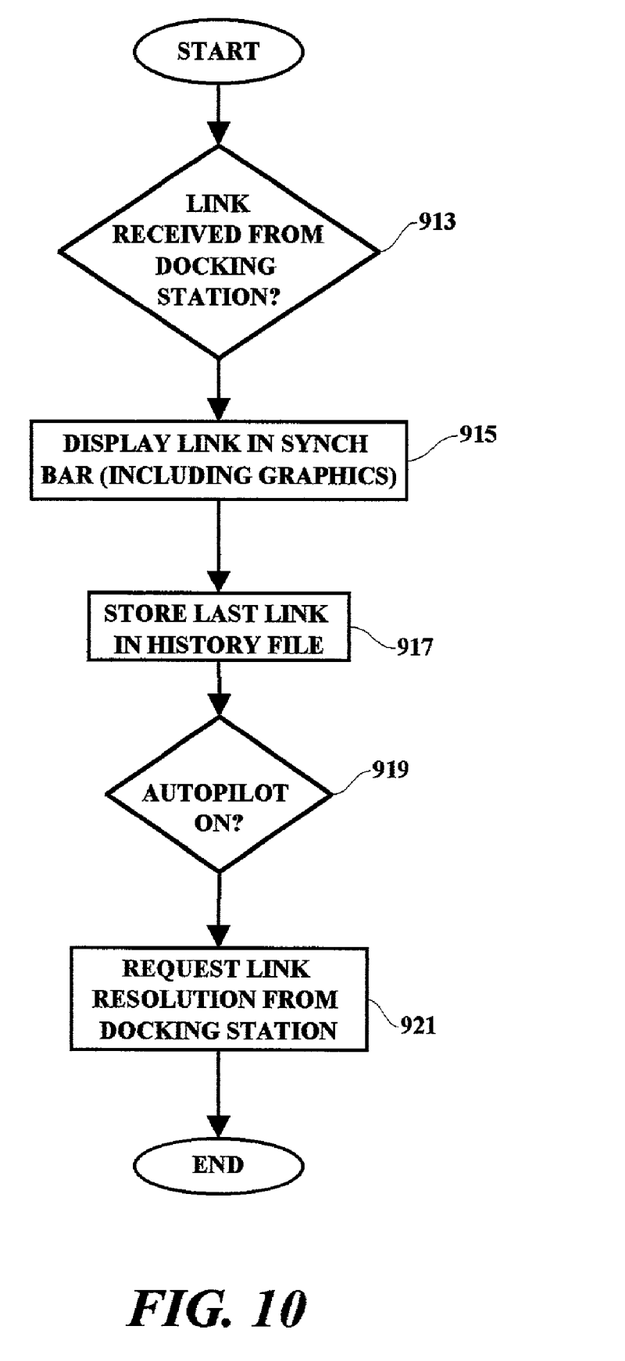
FIG. 10 is a flow chart illustrating an exemplary sequence of operation in connection with an IM unit in conjunction with the docking unit.
Figure 11:
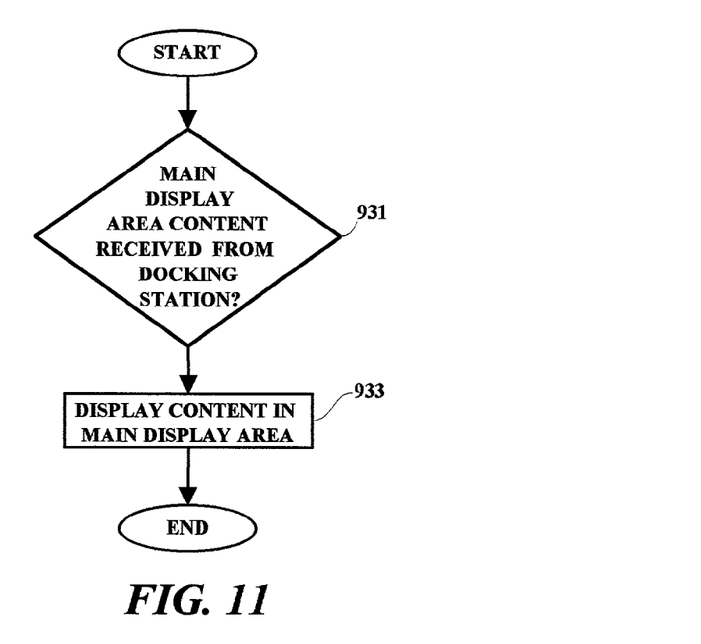
FIG. 11 is a flow chart illustrating receipt and display of a content screen by an IM unit.

As shown in FIG. 10, when a link is activated and content is received at the docking station 913, the link identity is displayed in the lower portion of the pad display area 915 and the previous link is stored 917 in a history file for subsequent selective operator retrieval. If the autopilot is ON 919, then the IM pad will request the link resolution from the docking station 921. As the requested link resolution is received from the docking station 931, the retrieved content is displayed in the main content area 501 of the IM unit 119. This process will continue until the operator exits from the autopilot mode into a manual mode, or turns off the system.

It is noted that the disclosed IM system is not limited to providing additional information related to TV programs. The IM system can also be used in many other environments including, for example, a remote learning classroom environment where a teacher is running a class via a TV monitor. Students with individual IM units can follow along in context to what is being taught, ask questions, participate in feedback and, by switching into "manual" mode, a student can even obtain additional subject matter relater content.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory unit, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for managing content displayed on an information management (IM) unit, said method comprising:
    enabling a user to select a first input for receipt by said IM unit, said first input comprising a synchronized datastream received from a server, said synchronized datastream being synchronized with an event being presented to said user in a first medium, said first medium being separate from said IM unit; and
    enabling said user to select a second input for receipt by said IM unit, of information which is unsynchronized with said event, said IM unit being enabled for displaying information related to said first and second inputs on said IM unit.

2. The method as set forth in claim 1 wherein said IM unit is enabled to be coupled to a docking station, said IM unit including means for displaying content associated with said first and second inputs.

3. The method as set forth in claim 2 wherein said display means comprises a touchsensitive display screen by which said user is enabled to make selections by applying pressure to selected display screen areas.

4. The method as set forth in claim 3 wherein said first medium includes a display of a streaming video or audio presentation.

5. The method as set forth in claim 4 wherein said IM unit further includes an indicator to indicate which of said first and second inputs is selected.

6. The method as set forth in claim 4 wherein said IM unit further includes an indicator to indicate a channel identification source for said first input.

7. The method as set forth in claim 4 wherein said IM unit further includes means for retrieving a history file, said history file containing a history of links displayed on said IM unit.

8. The method as set forth in claim 1 wherein said first input is synchronized with a television signal for a selected television program, and said second input is provided through a connection to an Internet server.

9. The method as set forth in claim 1 and further including means arranged to enable said user to switch between said first and second inputs such that said first input is displayed in real-time content position relative to said event after switching from said second input.

10. A system for managing content displayed on an information management (IM) unit, said system comprising:

enabling a user to select a first input for receipt by said IM unit, said first input comprising a synchronized datastream received from a server, said synchronized datastream being synchronized with an event being presented to said user in a first medium, said first medium being separate from said IM unit; and means for enabling said user to select a second input for receipt by said IM unit, of information which is unsynchronized with said event, said IM unit being enabled for displaying information related to said first and second inputs on said IM unit.

* * * * *